(12) United States Patent
Wang et al.

(10) Patent No.: US 10,999,704 B2
(45) Date of Patent: May 4, 2021

(54) METHOD AND DEVICE FOR DETERMINING SPACE PARTITIONING OF ENVIRONMENT

(71) Applicant: Nokia Solutions and Networks Oy, Espoo (FI)

(72) Inventors: Nan Wang, Shanghai (CN); Guifeng Song, Shanghai (CN); Jianwen Yao, Shanghai (CN); Bin Xu, Shanghai (CN); Cheng Qian, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/763,388

(22) PCT Filed: Nov. 15, 2017

(86) PCT No.: PCT/CN2017/111006
§ 371 (c)(1),
(2) Date: May 12, 2020

(87) PCT Pub. No.: WO2019/095123
PCT Pub. Date: May 23, 2019

(65) Prior Publication Data
US 2021/0076162 A1    Mar. 11, 2021

(51) Int. Cl.
*H04W 4/02* (2018.01)
*H04W 4/029* (2018.01)

(52) U.S. Cl.
CPC .......... *H04W 4/029* (2018.02); *H04W 4/027* (2013.01)

(58) Field of Classification Search
CPC .......... H04W 4/029; H04W 4/027; G06T 7/70
See application file for complete search history.

(56) References Cited

U.S. PATENT DOCUMENTS

2015/0109407 A1    4/2015  Giger

FOREIGN PATENT DOCUMENTS

| CN | 105147198 A | 12/2015 |
| CN | 106353722 A | 1/2017 |
| CN | 107339992 A | 11/2017 |

OTHER PUBLICATIONS

International Search Report PCT/ISA/210 for International Application No. PCT/CN2017/111006 dated Jul. 27, 2018.
Written Opinion of the International Searching Authority PCT/ISA/237 for International Application No. PCT/CN2017/111006 dated Jul. 27, 2018.

*Primary Examiner* — Curtis B Odom
(74) *Attorney, Agent, or Firm* — Harness, Dickey & Pierce, P.L.C.

(57) ABSTRACT

In one embodiment, a movement footprint of a user walking along a wall in the environment is determined at least in part based on a communication between a first communication device and a second communication device. The first communication device is carried by the user, and the second communication device is placed in the environment. A representation of the spatial division of the environment is generated based on the determined movement footprint. An estimated size associated with at least one reference object in the environment is determined according to the representation of the spatial division, and a reference size associated with the at least one reference object is obtained. Further, the representation of the spatial division is adjusted based on the estimated size and the reference size.

27 Claims, 8 Drawing Sheets

METHOD AND DEVICE FOR DETERMINING SPACE PARTITIONING OF ENVIRONMENT

CROSS-REFERENCE TO RELATED APPLICATIONS

This application is a national phase under 35 U.S.C. § 371 of PCT International Application No. PCT/CN2017/111,006 which has an International filing date of Nov. 15, 2017, the entire contents of each of which are hereby incorporated by reference.

FIELD

Embodiments of the present disclosure generally relate to information processing, and more specifically to a method and device for determining spatial division of an environment.

BACKGROUND

A wireless access node (AP) based on wireless fidelity (Wi-Fi) technology has become an essential household infrastructure. With such a Wi-Fi AP, people may use various electronic devices, such as smart phones, desktop computers, notebook computers, tablet computers, to wirelessly access the Internet at home. However, quality of a radio signal transmitted by the Wi-Fi AP usually cannot meet actual needs of a user due to mismatching of AP placement and a room layout in a user residence. For example, the Wi-Fi AP is usually placed in a living room of the user residence. Accordingly, the radio signal is usually stronger in the living room but weaker in a bedroom away from the living room.

In order to enhance Wi-Fi coverage in the user residence, a conventional approach is that an engineer of a telecommunication operator for providing a Wi-Fi service analyzes the quality of the Wi-Fi signal in each room according to an indoor layout drawing of the user residence. In this case, the telecommunication operator can provide a door-to-door service in which the engineer carries a special instrument (for example, a Wi-Fi signal quality analyzer) and walks around the individual rooms in the user residence.

However, due to security, privacy and other considerations, many users hesitate to call such a door-to-door service, and even some users will refuse the engineer from the telecommunication operator (or a staff from other service providers such as a remote interior decoration service provider) to enter his/her home. If the indoor layout drawing of the user residence can be obtained remotely, human and material costs required by the door-to-door service of the telecommunication operator and other remote service providers may be saved on the one hand, and, on the other hand, user experience may be significantly improved.

In addition, a remote third-party online house rental service (such as an inter-house rental service provided by a third party) is rapidly emerging. If a tenant has questions about an actually living area or room type, he/she may ask the third party to remotely obtain an indoor layout drawing (or a room plan) of the residence, and compare it with the indoor layout drawing (or the room plan) provided by a landlord, so that the third party can perform remote authentication and handle disputes correctly.

SUMMARY

In general, embodiments of the present disclosure provide a method and device for determining spatial division of an environment.

In a first aspect, embodiments of the present disclosure provide a method of determining spatial division of an environment. The method comprises: determining a movement footprint of a user walking along a wall in the environment at least in part based on a communication between a first communication device and a second communication device, the first communication device being carried by the user, and the second communication device being placed in the environment; generating a representation of the spatial division of the environment based on the determined movement footprint; determining an estimated size associated with at least one reference object in the environment according to the representation of the spatial division; obtaining a reference size associated with the at least one reference object; and adjusting the representation of the spatial division based on a comparison of the estimated size and the reference size.

In a second aspect, embodiments of the present disclosure provide an electronic device. The electronic device comprises a processor, and a memory coupled to the processor and storing instructions, the instructions, when executed by the processor, causing the electronic device to: determine a movement footprint of a user walking along a wall in the environment at least in part based on a communication between a first communication device and a second communication device, the first communication device being carried by the user, and the second communication device being placed in the environment; generate a representation of the spatial division of the environment based on the determined movement footprint; determine an estimated size associated with at least one reference object in the environment according to the representation of the spatial division; obtain a reference size associated with the at least one reference object; and adjust the representation of the spatial division based on a comparison of the estimated size and the reference size.

In a third aspect, embodiments of the present disclosure provide a non-transitory computer readable storage medium tangibly storing instructions, the instructions, when executed by the processor, causing the processor to implement the method according to the first aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

In conjunction with the accompanying drawings and with reference to the following detailed description, the above and other features, advantages, and aspects of embodiments of the present disclosure will become more apparent. In the drawings, the same or similar reference numerals represent the same or similar element, wherein.

DETAILED DESCRIPTION OF EMBODIMENTS

Figure 1:
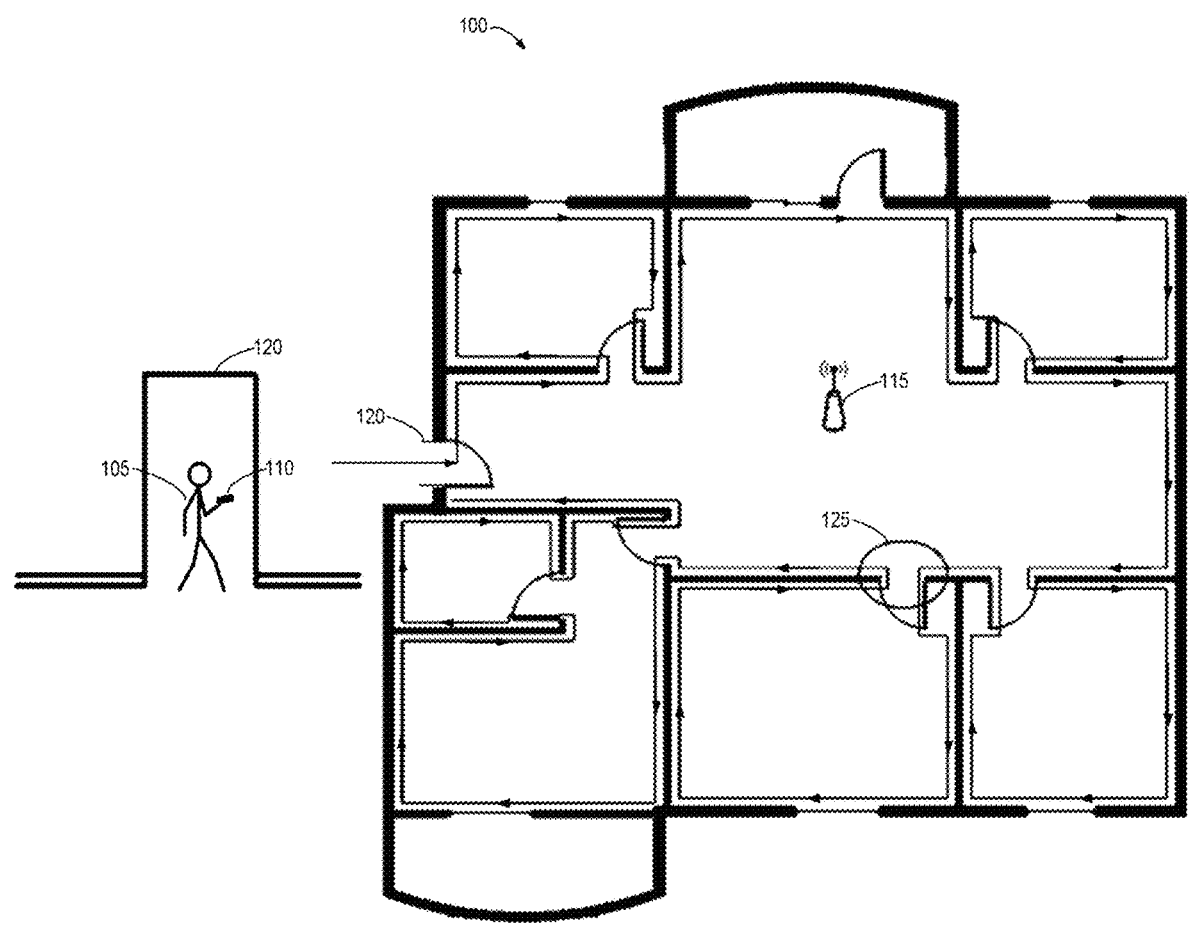
FIG. 1 illustrates a floor plan of an example environment in which embodiments of the present disclosure may be implemented.

Hereinafter, embodiments of the present disclosure will be described in more detail with reference to the accompanying drawings. Although some embodiments of the present disclosure are illustrated in the drawings, it is to be understood that the present disclosure may be implemented through various forms, but may not be interpreted as being limited to the embodiments illustrated herein. On the contrary, these embodiments are only intended to understand the present disclosure more thoroughly and completely. It is to be understood that the accompanying drawings and embodiments of the present disclosure are only for the purpose of illustration, without suggesting any limitation of the protection scope of the present disclosure.

As used herein, the terms "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As mentioned above, conventionally, for a telecommunication operator to determine the coverage of the Wi-Fi signal in user home or for a remote house rental service provider or a remote interior decoration service provider to obtain the layout of the user home, an engineer usually needs to be assigned to the user home for on-site measurements. However, this door-to-door service consumes a lot of human and material costs on one hand, and, on the other hand, may cause user doubts or even user rejection, thereby causing a service failure.

If the layout drawing of the user residence can be obtained remotely, the above problems can be effectively avoided. However, at present, most users cannot provide accurate indoor layout drawings of their homes. To this end, a conventional solution is that an engineer of a service provider draws a room plan of a user residence by calling a user for inquiry, or calls the user to ask him or her to draw the indoor layout drawing of his/her home. It is apparent that this approach cannot meet the corresponding service requirements in terms of accuracy and convenience. Another solution is to ask a real estate developer or a property management service company to provide a room plan of the user residence. However, these companies usually are not intended to or cannot provide a sufficiently accurate room plan.

Embodiments of the present disclosure provide a novel method of determining spatial division of an environment. Different from the conventional approach in which an engineer performs on-site measurements or communicates with the user through phone calls, the present disclosure automatically determines a representation of the spatial division of the environment based on a movement footprint of a user in the environment. Further, the determined representation of the spatial division is adjusted according to a relevant size of a reference object in the environment. This automatic closed-loop feedback control scheme significantly improves the accuracy of the determined spatial division of the environment.

Considering an example of determining a room plan of a user residence, according to embodiments of the present disclosure, a representation such as a room plan of the residence of spatial division of an environment such as the residence may be automatically determined based on a movement footprint of a user along walls in the environment. Next, an estimated size associated with at least one reference object, such as an estimated width of a door of a room or a corridor or a distance between two reference objects, in the environment is determined based on the determined representation of the spatial division, and a reference size associated with the at least one reference object is obtained, for example, by user measurements. The representation of the determined spatial division of the environment is adjusted based on the comparison of the reference size and the estimated size. As such, the spatial division of the environment can be determined in a relatively accurate way. The principle and specific implementation of the present disclosure will be described in detail below with reference to FIGS. 1 to 9.

FIG. 1 illustrates a plan view of an example environment 100 in which embodiments of the present disclosure may be implemented. The environment 100 may be an indoor environment such as a residence, an apartment, an office building, a shopping mall, a hotel, and the like, or may be an outdoor environment for which spatial division needs to be determined with Wi-Fi deployed, for example. In this example, the environment 100 is a residence of a user 105, which includes a plurality of rooms.

As shown in FIG. 1, according to embodiments of the present disclosure, the environment 100 comprises a communication device 110 (referred to as a "first communication device" 110) carried by a user 105 and one or more additional communication devices 115 (referred to a "second communication device" 115) capable of communicating therewith. The first communication device 110 may be any suitable terminal device or entity with a wireless communication capability. As an example, the first communication device 110 may include, but is not limited to, a smartphone, a Personal Digital Assistant (PDA), a notebook computer, a tablet computer, a digital camera, a media player, a game console joystick, and so on. Accordingly, the second communication device 115 may be any suitable device or entity capable of communicating with the first communication device 110, including a network device and a terminal device. As an example of the network device, the second communication device 115 may include, but is not limited to, an access point (AP), a home base station, a wireless router and the like. As an example of the terminal device, the second communication device 115 includes, but is not limited to, a smartphone, PDA, notebook computer, tablet computer, digital camera, media player, game console joystick and the like.

The communication between the first communication device 110 and the second communication device 115 may use any appropriate wireless communication technology and follow a corresponding communication standard. Examples of the communication standard include, but are not limited to, Long Term Evolution (LTE), LTE-Advanced (LTE-A), Wideband Code Division Multiple Access (WCDMA), Code Division Multiple Access (CDMA), Global System for Mobile Communications (GSM), Orthogonal Frequency Division Multiplexing (OFDM), Wireless Local Area Network (WLAN), Global Interoperability for Microwave Access (WiMAX), Wireless Fidelity (Wi-Fi), Bluetooth, Zigbee Technology, Machine Type Communication (MTC), D2D, M2M, and the like.

In some embodiments of the present disclosure, for the purpose of discussion, a smartphone is mainly taken as an example of the first communication device 110, a Wi-Fi AP is taken as an example of the second communication device 115, and the Wi-Fi communication standard is taken as an example communication standard between the first communication device 110 and the second communication device 115. However, it should be understood that this is merely to enable those having ordinary skill in the art to better understand the principles and ideas of the embodiments of the present disclosure, and is not intended to limit the scope of the present disclosure in any way.

The second communication device 115 may be placed in one or more locations in the environment 100 in any suitable manner. As shown in FIG. 1, in this example, the second communication device 115 implemented by a Wi-Fi AP is placed in the living room of the residence of the user 150. However, it should be understood that this is only for the purpose of illustration. Depending on the specific implementation and actual needs, any suitable number of second communication devices 115 may be placed in the environment 100. In some embodiments, considering the Wi-Fi coverage, a plurality of second communication devices 115 capable of Wi-Fi communication may be placed in the environment 100 to communicate with the first communication device 110 carried by the user 105 when the user 105 travels in the environment 100.

For example, in the embodiment where the environment 100 is the residence of the user 105, a plurality of Wi-Fi APs as the second communication devices 115 may be placed in a plurality of rooms of the residence. Alternatively or in addition, a smartphone or a notebook computer or the like set as a Wi-Fi hotspot may be used as the second communication device 115 and placed in one or more rooms of the residence. In addition, in an embodiment where the first communication device 110 has a Bluetooth function and the second communication device 115 is implemented by a Bluetooth module, a plurality of second communication devices 115 may be arranged on walls or objects in the environment 100.

In order to obtain a representation of the spatial division of the environment 100 (for example, a room plan of the individual rooms in the residence), the user 105 may hold the first communication device 110 and walk from an entrance door 120 along the wall in the environment 100, for example, in a clockwise direction as indicated by the arrow. It should be understood that it is also feasible for the user 105 to walk in other directions. For example, the user 105 may walk in a counterclockwise direction. In a certain area in the environment 100, the user 105 may walk back and forth for accurate measurements, for example.

Figure 2:
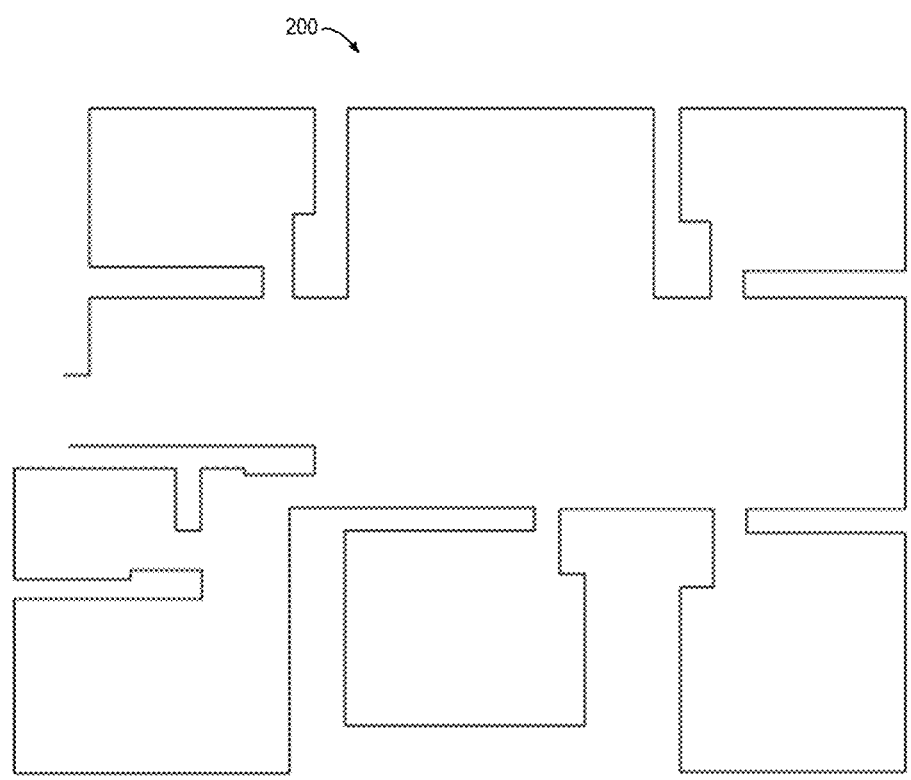
FIG. 2 illustrates an example movement footprint of a user determined based on a communication between a first communication device and a second communication device according to some embodiments of the present disclosure.

According to embodiments of the present disclosure, a movement footprint of the user 105 is determined based on the communication between the first communication device 110 and the second communication device 115. FIG. 2 illustrates an example movement footprint 200 of the user 105 walking along the wall in the environment 100 as determined by communication between the first communication device 110 and the second communication device 115 according to some embodiments of the present disclosure.

The movement footprint 200 may be determined in any suitable manner. In the embodiment in which a Wi-Fi communication is allowed between the first communication device 110 and the second communication device 115, as an example, if a plurality of antennas are arranged in the first communication device 110 and/or the second communication device 115, a propagation direction of a radio signal is determined with an angle-of-arrival (AoA) technique by measuring a time difference of arrival (TDoA) of the individual antennas. As another example, the propagation time of the radio signal is measured using a TDoA and other schemes based on time of flight (ToF), and, therefore, the distance between the first communication device 110 and the second communication device 115 may be calculated. Alternatively or in addition, a Received Signal Strength Indication (RSSI) related approach, such as a fingerprint recognition or Signal Propagation Model (SPM) scheme, may be used to determine the distance between the first communication device 110 and the second communication device 115 based on the measurement of the power of the received signal. Then, the movement footprint 200 of the user 105 may be determined based on the determined direction and distance. For example, the movement footprint 200 may be formed by connecting a plurality of positioning points of the first communication device 110 in a chronological order.

In the embodiment in which a Bluetooth communication is allowed between the first communication device 110 and the second communication device 115, a positioning technique based on an ibeacon signal may be used to determine the movement footprint 200. In an embodiment in which a Zigbee communication is allowed between the first communication device 110 and the second communication device 115, a Zigbee-related positioning technology may be utilized to determine the movement footprint 200. It should be understood that any positioning algorithm based on radio signal transmission, which is currently known or to be developed in the future, can be used herein.

In some embodiments, in order to further improve the accuracy in determining the movement footprint 200, in addition to the communication between the first communication device 110 and the second communication device 115, the movement footprint 200 may be determined further based on geomagnetic data sensed by a geomagnetic sensor in the first communication device 110 while the user is walking, to improve the actual positioning precision of the movement footprint 200. At present, many smart phones are embedded with geomagnetic sensors. Any geomagnetic data-based positioning algorithm currently known or to be developed in the future may be used in combination with the embodiments of the present disclosure.

Considering the general requirements of geomagnetic positioning technology, in an embodiment in which a smartphone with a geomagnetic sensor embedded therein acts as the first communication device 110, the user 105 may hold the first communication device 110 horizontally while walking. In some embodiments, the user 105 may keep the first communication device 110 horizontal by using a selfie stick, which allows the user 105 to pass around objects or obstacles while walking along the wall in the environment 100.

Figure 3:
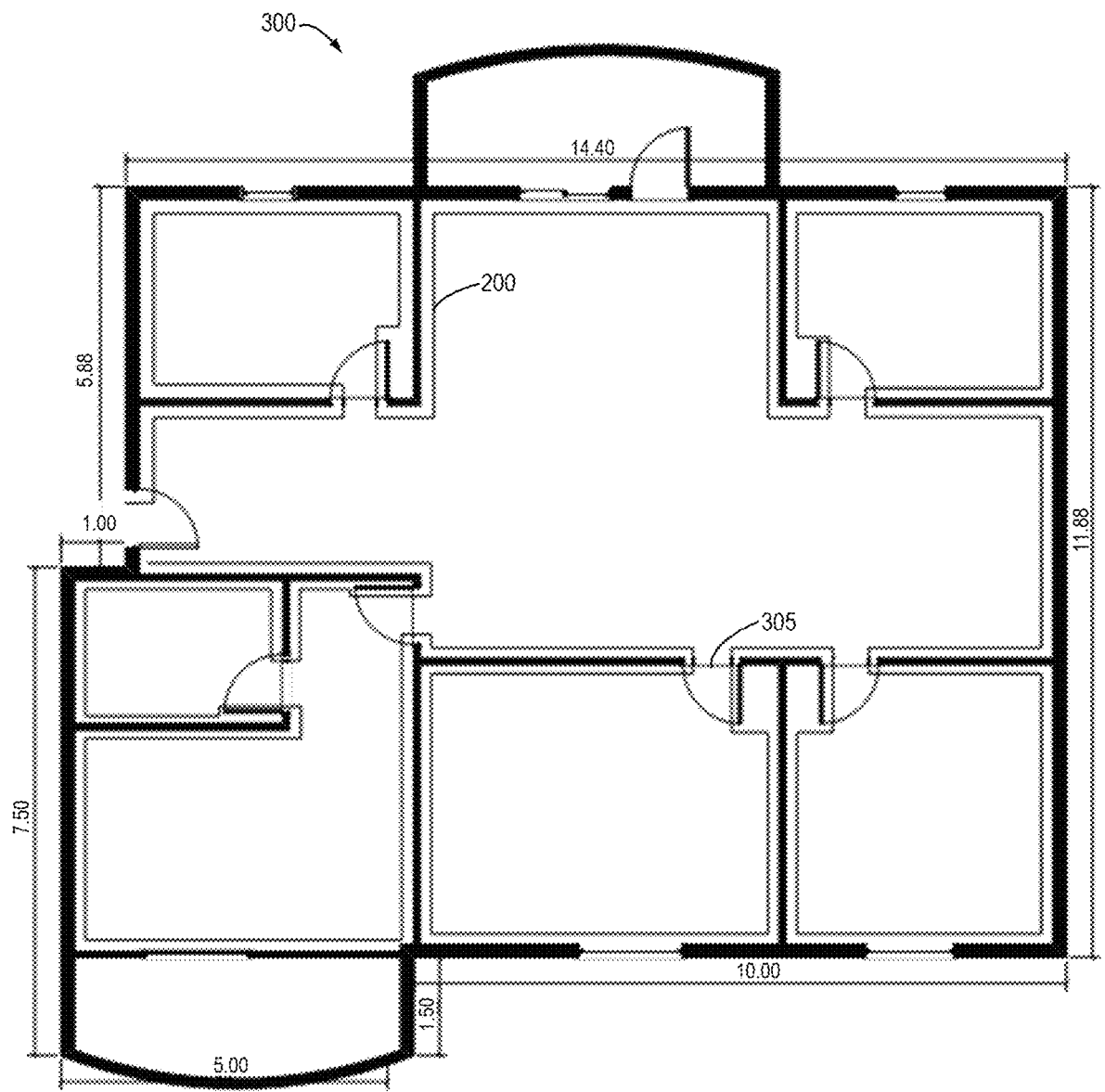
FIG. 3 illustrates an example representation of spatial division of the environment generated based on the movement footprint according to some embodiments of the present disclosure.

Based on the determined movement footprint 200 of the user 105, a representation of the spatial division of the environment 100 can be generated. FIG. 3 illustrates an example representation of the spatial division of the environment 100 generated based on the movement footprint 200 according to some embodiments of the present disclosure. As shown in FIG. 3, in this example, the representation 300 involves multiple dimensions (in meters) of the spatial division of the environment 100.

According to embodiments of the present disclosure, the representation 300 can be adjusted based on the size associated with a reference object within the environment 100 in order to improve the accuracy of the generated representation 300. Still with reference to FIG. 1, in this example, a door 125 in the environment 100 is a reference object (referred to as a "first reference object"). The reference width of the door 125 may be used as the reference size of the first reference object for adjusting the representation 300 of the spatial division of the environment 100.

The reference width of the door 125 may be obtained in any suitable manner. In the case where the first communication device 110 is equipped with a ranging sensor, the width of the door 125 may be sensed via the ranging sensor as the reference width. For example, in the embodiment in which the first communication device 110 is implemented by a smartphone, the first communication device 110 may be integrated with a camera and a ranging sensor. A distance from a captured object to the camera may be sensed by the ranging sensor, and the camera may perform autofocus when taking pictures. In this example, the user 105 at one side of a door frame of the door 125 may use the camera of the first communication device 110 to take a picture for a certain location at the other side of the door frame. When the camera performs autofocus, the distance sensed by the ranging sensor may be obtained as the reference width of the door 125.

The ranging sensor may implement the distance-measuring function in any suitable manner. For example, the ranging sensor may measure the distance based on ToF of a laser signal. This approach significantly resists interferences from ambient lights and is more robust to optical crosstalk of a protective glass cover of the camera. It should be understood that any suitable ranging sensor currently known or to be developed in the future may be used herein.

In addition to using the ranging sensor, the reference width of the door 125 may be obtained in any other ways. For example, the width of the door 125 may be manually measured by the user 105 with a ruler, and then the measured width is input into the first communication device 110 as the reference width of the door 125. In addition, in the case where the user 105 already knows the width of the door 125, the width may be manually input directly into the first communication device 110 as the reference width.

According to embodiments of the present disclosure, in addition to obtaining the reference width of the door 125, the estimated width of the door 125 may be determined according to the generated representation 300 of the spatial division of the environment 100 (for example, as labeled by 305 in FIG. 3). Then, the representation 300 is adjusted based on the comparison of the reference width and the estimated width 305 of the door 125. Example adjustment will be discussed below with reference to FIGS. 4 and 5.

Figure 4:
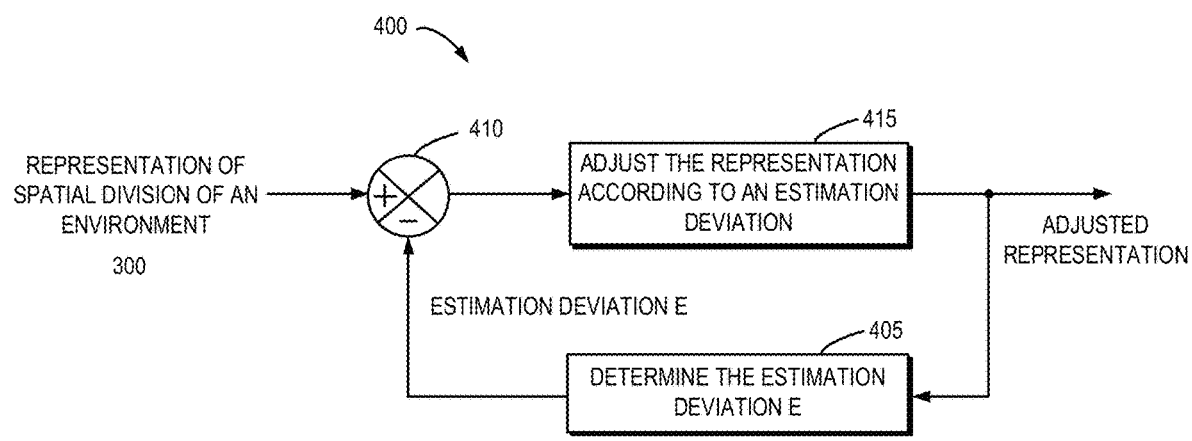
FIG. 4 illustrates an example process of adjusting the representation of the spatial division of the environment according to some embodiments of the present disclosure.
Figure 5:
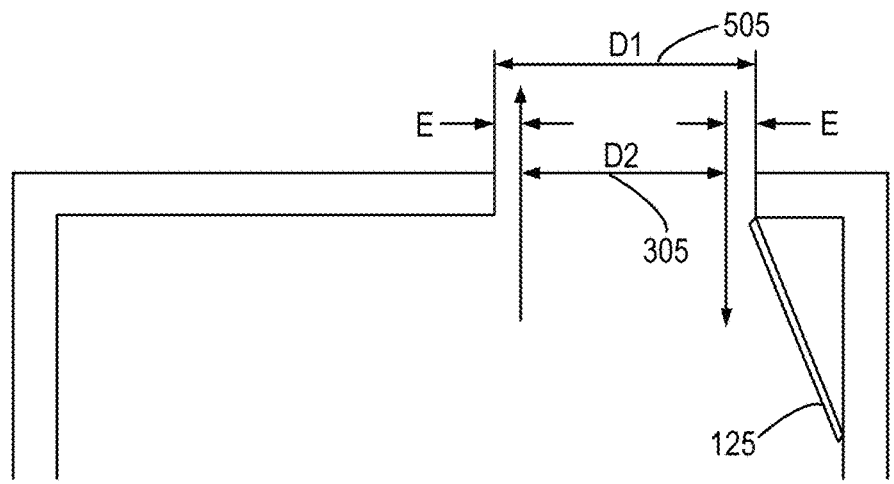
FIG. 5 illustrates an example approach for determining an estimation deviation of an estimated size associated with a reference object within an environment according to some embodiments of the present disclosure.

FIG. 4 illustrates an example process 400 of adjusting the representation 300 according to some embodiments of the present disclosure. As shown in FIG. 4, at 405, an estimation deviation E is determined. FIG. 5 shows an example approach of determining the estimation deviation E. In this example, D1 represents a reference width 505 of the door 125, and D2 represents the estimated width 305 of the door 125 determined according to the representation 300. Thus, the estimation deviation E may be determined as follows:

$$E=(D1-D2)/2.$$

After the estimation deviation E is determined, the value of the estimation deviation E may be input to a comparator 410 in FIG. 4 as a feedback value of a closed-loop feedback control system, and the representation 300 is used as another input to the comparator 410. At 415, the representation 300 is adjusted based on the estimation deviation E. For example, the representation 300 is increased based on the value of E in the individual dimensions. The accuracy of the generated representation 300 of the spatial division of the environment 100 may be significantly improved by the closed-loop feedback control system.

It should be understood that using the door 125 as the reference object for adjusting the representation 300 is only for the purpose of illustration, without suggesting any limitation to the scope of the present disclosure. Any suitable other objects in the environment 100 may be used as reference objects. For example, in the embodiment where the environment 100 is the residence of the user 105, a corridor in the residence or a window in a certain room may be taken as a reference object. In some embodiments, the representation 300 may be adjusted based on the estimated distance and the reference distance between two reference objects (referred to as a "second reference object" and a "third reference object", respectively) in the environment 100.

It should further be understood that the determination of the estimated size associated with the reference object based on the generated representation 300 is described above following the obtaining of the reference size associated with the reference object, only for the purpose of illustration, without suggesting any limitation. In some embodiments, the two operations or acts may be performed in parallel or in a completely reverse order.

Figure 6:
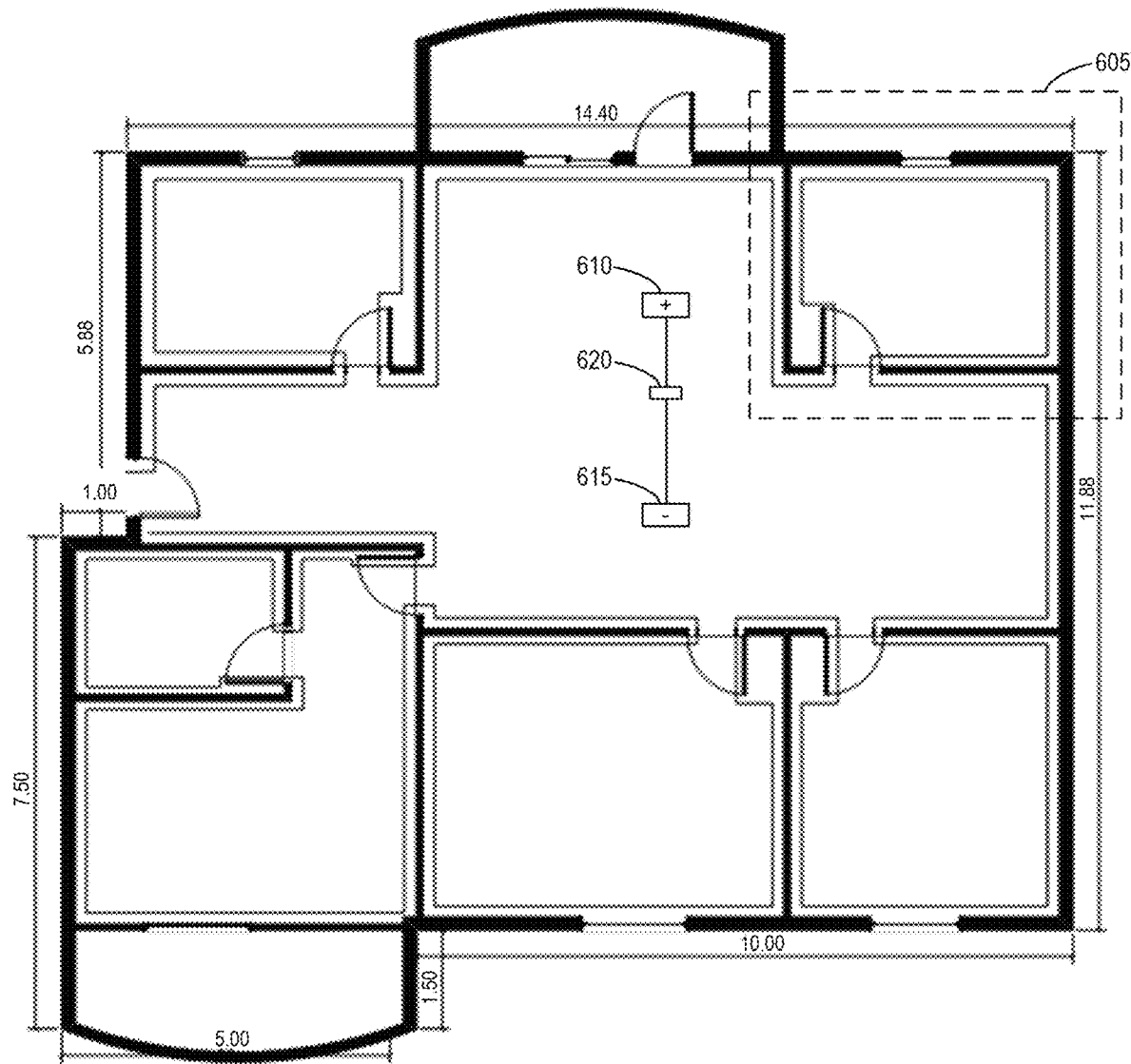
FIG. 6 illustrates an example approach of adjusting the representation of the spatial division of the environment based on a user input according to some embodiments of the present disclosure.

In some embodiments, in order to further improve the accuracy of the generated representation 300, the representation 300 may be adjusted further based on a user input. A specific example will be discussed below with reference to FIG. 6, which shows an example approach of adjusting the representation 300 based on a user input. As shown in FIG. 6, the user 105 may select an area 605 in the environment 100, and then drag a button 620 toward a button 610 with "+" or a button 615 with "−" to enlarge or reduce the area 605. After adjusting the area 605, the user 105 may select other areas in the environment 100 to continue the above adjustment. The adjustment based on the user input may be performed after or before the adjustment based on the related size of the reference object. After the adjustment, the representation 300 may be further adjusted by using the process 300 described above with reference to FIG. 4 based on the feedback value measured by the user, such as the estimation deviation E.

In some embodiments, the adjusted representation 300 may be sent to a server (not shown). In this way, the spatial division of the environment 100 may be determined on a server side in a quick, efficient, and lower-cost but accurate way, thereby allowing provision of a better service to the user 105.

Figure 7:
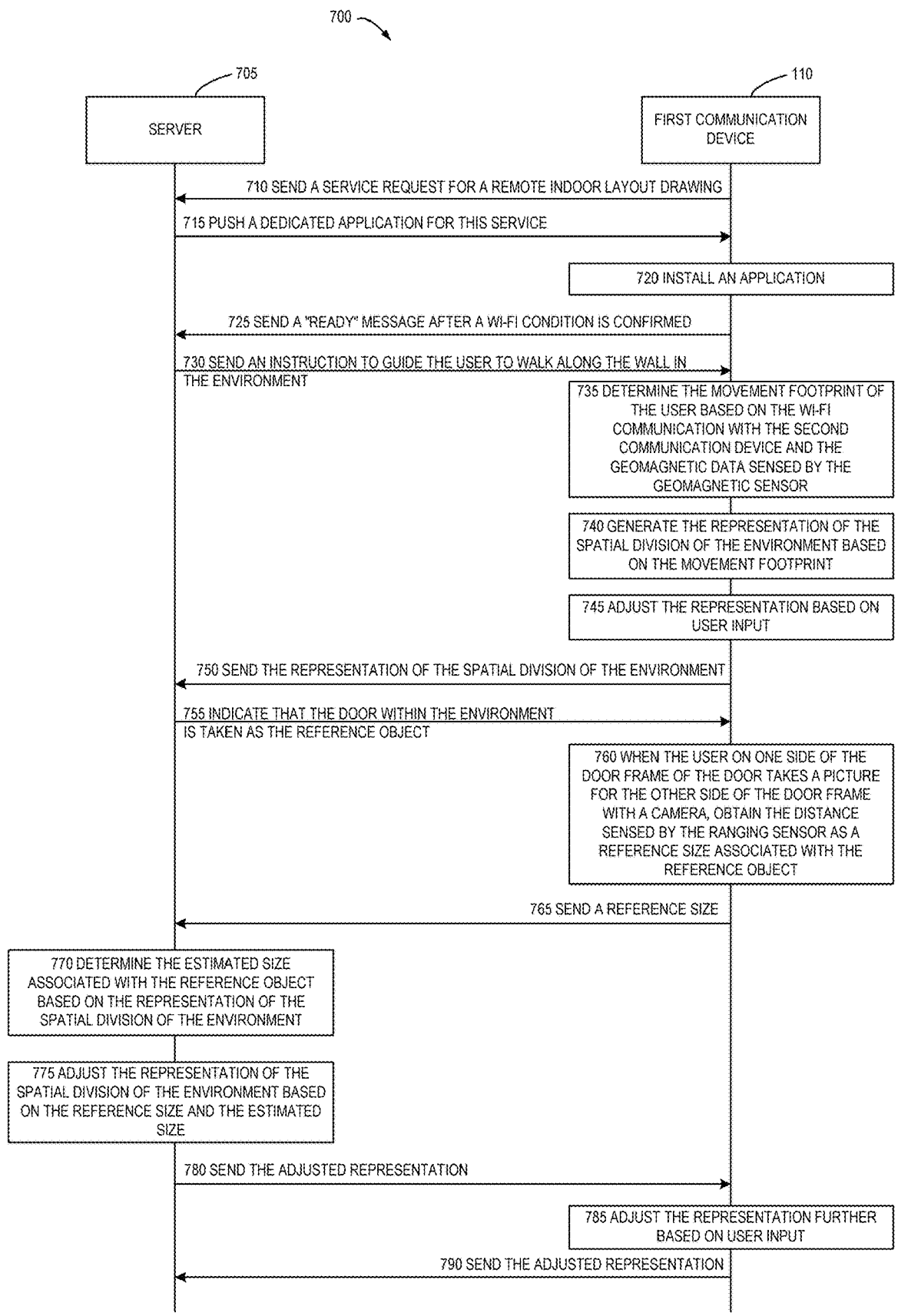
FIG. 7 illustrates an example interaction process between a server and a first communication device according to some embodiments of the present disclosure.

In some embodiments, in order to simplify the operation on a user side, the adjustment of the representation 300 may be performed remotely on the server side. A specific example will be discussed below with reference to FIG. 7. FIG. 7 shows an example interaction process 700 between a server 705 and the first communication device 110 carried by the user 105 according to some embodiments of the present disclosure.

As shown in FIG. 7, at 710, the first communication device 110 sends a service request for a remote indoor layout drawing to the server 705. At 715, the server 705 pushes a dedicated application for this service to the first communication device 110. At 720, this application is installed at the first communication device 110. At 725, after a necessary Wi-Fi condition is confirmed (for example, the Wi-Fi signal is detected by the first communication device 110), the first communication device 110 sends a "ready" message to the server 705. At 730, the server 705 sends an instruction to the first communication device 110 to guide the user to hold the first communication device 110 horizontally and walk along the wall in the environment 100 in a fixed direction (for example, a clockwise or counterclockwise direction).

At 735, the movement footprint 200 of the user 105 is determined based on the Wi-Fi communication with the second communication device 115 and the geomagnetic data sensed by the geomagnetic sensor. At 740, the representation 300 of the spatial division of the environment 100 is generated based on the movement footprint 200, and the representation 300 is adjusted based on a user input at 745. At 750, the first communication device 110 sends to the server 705 the representation 300 of the spatial division of the environment 100.

At 755, the server 705 sends to the first communication device 110 an indication that the door 125 within the environment 100 is taken as a reference object. At 760, when the user 105 at one side of the door frame of the door 125 takes a picture for the other side of the door frame with a camera, the distance sensed by the ranging sensor is obtained as a reference size associated with the reference object. At 765, the first communication device 110 sends the reference width to the server 705.

Then, the closed-loop feedback automatic control system according to embodiments of the present disclosure is used on the side of the server 705 to adjust the representation 300 of the spatial division of the environment 100. Specifically, at 770, the estimated size associated with the reference object is determined based on the representation 300 of the spatial division of the environment 100. At 775, the representation 300 is adjusted based on the reference size and the estimated size. Next, at 780, the server 705 sends the adjusted representation 300 to the first communication device 110. At 785, on the side of the first communication device 110, the user 105 may use the buttons 610, 615, and 620 shown in FIG. 6 to adjust the individual areas in the representation 300 one by one. At 790, the first communication device 110 sends the adjusted representation 300 to the server 705. As such, the server 705 may relatively accurately determine the spatial division of the environment 100.

Figure 8:
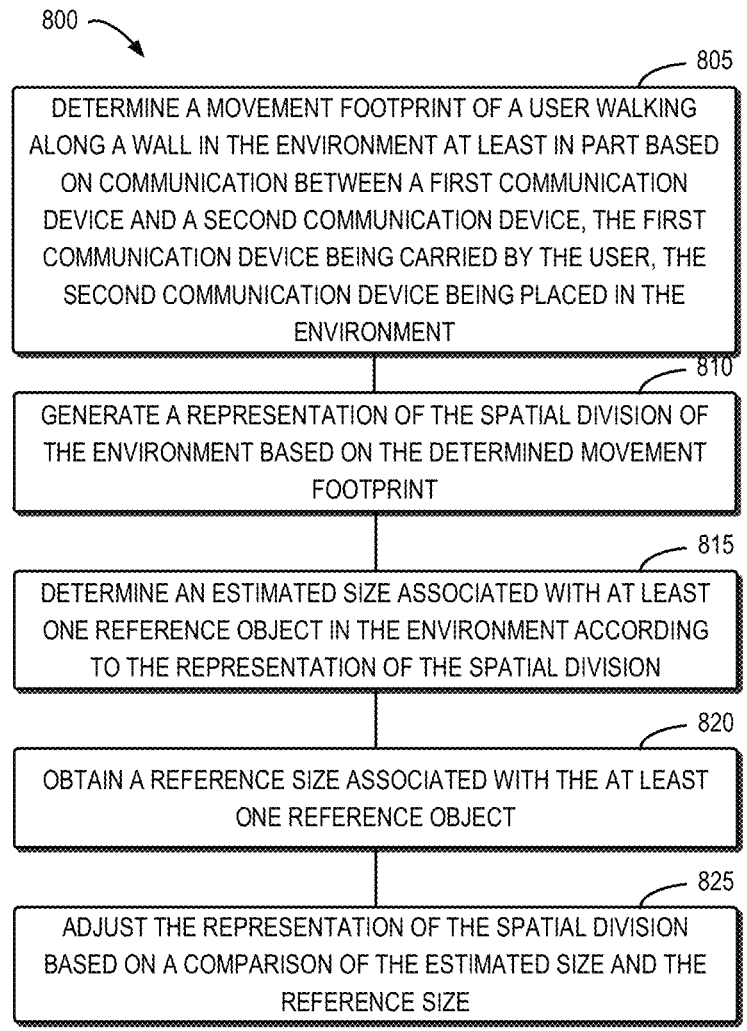
FIG. 8 illustrates a flowchart of an example method according to some embodiments of the present disclosure.

FIG. 8 illustrates a flowchart of an example method 800 according to some embodiments of the present disclosure. The method 800 may be implemented at the first communication device 110 as shown in FIG. 1. For the purpose of discussion, the method 800 will be described in detail below with reference to FIGS. 1 to 7.

As shown in FIG. 8, at block 805, the movement footprint 200 of the user 105 walking along a wall in the environment 100 is determined based at least in part on a communication between the first communication device 110 and the second communication device 115. The first communication device 110 is carried by the user 105, and the second communication device 115 is arranged within the environment 100.

At block 810, the representation 300 of the spatial division of the environment 100 is generated based on the determined movement footprint 200. At block 815, an estimated size associated with at least one reference object within the environment 100 is determined based on the representation 300 of the spatial division. At block 820, a reference size associated with the at least one reference object is obtained. At block 825, the representation 300 of the spatial division is adjusted based on a comparison of the estimated size and the reference size.

In some embodiments, determining the movement footprint 200 may comprise: obtaining geomagnetic data sensed by a geomagnetic sensor in the first communication device 110 while the user 105 is walking along the wall in the environment 100; and determining the movement footprint 200 based on the communication between the first communication device 110 and the second communication device 115 and the geomagnetic data.

In some embodiments, obtaining the estimated size associated with the at least one reference object may comprise obtaining the estimated size of the first reference object within the environment. Obtaining the reference size associated with the at least one reference object may comprise obtaining the reference size of the first reference object.

In some embodiments, the first reference object includes a door 125 or a corridor within the environment 100, and the reference size includes a reference width of the door 125 or a corridor.

In some embodiments, obtaining the reference size of the first reference object may comprise: obtaining the width of the door 125 or the corridor sensed by the ranging sensor in the first communication device 110 as the reference width.

In some embodiments, obtaining the estimated size associated with the at least one reference object may comprise obtaining an estimated distance between the second reference object and the third reference object within the environment. Obtaining the reference size associated with the at least one reference object may comprise obtaining a reference distance between the second reference object and the third reference object.

In some embodiments, the adjusted representation 300 of the spatial division may be sent to the server 705. In some embodiments, the representation 300 of the spatial division may be further adjusted based on a user input.

In some embodiments, the communication between the first communication device 110 and the second communication device 115 uses a wireless communication technology following one of Wi-Fi, Bluetooth, and Zigbee communication standards.

It should be understood that the operations and related features described above with reference to FIGS. 1 to 7 are likewise applicable to the method 800 performed by the first communication device 110 and have similar effects. For the purpose of simplification, the details will be omitted.

Figure 9:
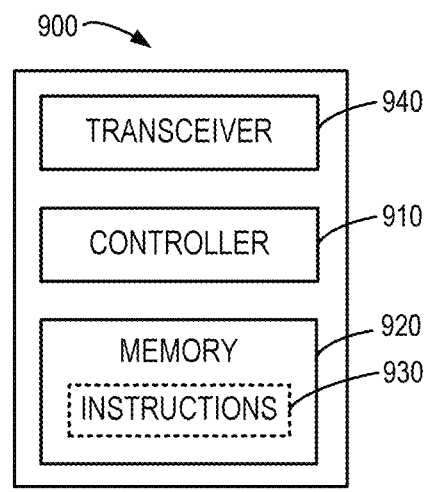
FIG. 9 illustrates a block diagram of a device suitable for implementing embodiments of the present disclosure.

FIG. 9 illustrates a block diagram of a device suitable for implementing embodiments of the present disclosure. The device 900 may be used to implement the first communication device 110 shown in FIG. 1.

As shown in FIG. 9, the device 900 comprises a controller 910. The controller 910 controls the operation and function of the device 900. For example, in some embodiments, the controller 910 may perform various operations by means of instructions 930 stored in a memory 920 coupled thereto. The memory 920 may be of any suitable type adapted for the local technical environment, may be implemented using any suitable data storage technology, and may include, but is not limited to, a semiconductor-based storage device, a magnetic storage device and system, and an optical storage device and system. Although only one memory unit is shown in FIG. 9, there may be a plurality of physically different memory units in the device 900.

The controller 910 may be of any suitable type adapted for the local technical environment, and may include, but is not limited to, one or more of a general-purpose computer, a special-purpose computer, a microcontroller, a digital signal controller (DSP) and a controller-based multi-core controller architecture. The device 900 may also comprise a plurality of controllers 910. The controller 910 is coupled to the transceiver 940, and the transceiver 940 may implement information reception and transmission via one or more antennas 950 and/or other components.

The controller 910 and the transceiver 940 may cooperatively operate to implement the operations and acts performed by the first communication device 110 described above with reference to FIGS. 1 to 8. All the features described above with reference to FIGS. 1 to 8 are applicable to the device 900, and will not be detailed any more here.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it will be appreciated that the blocks, device, systems, techniques or methods disclosed herein may be implemented in, as non-limiting examples, hardware, software, firmware, special purpose circuits or logic, general purpose hardware or controller or other computing devices, or some combination thereof.

As an example, the embodiments of the subject matter disclosed herein can be described in a context of machine-executable instructions which are included, for instance, in the program module executed in the device on a target real or virtual processer. Generally, a program module includes routine, program, bank, object, class, component and data structure, etc. and performs a particular task or implements a particular abstract data structure. In the embodiments, the functions of the program modules can be combined or divided among the described program modules. The machine executable instructions for the program module can be executed locally or in a distributed device. In the distributed device, the program module can be located in both of the local and remote storage mediums.

The computer program code for implementing the method of the present disclosure may be complied with one or more programming languages. These computer program codes may be provided to a general-purpose computer, a dedicated computer or a processor of other programmable data processing devices, such that when the program codes are executed by the computer or other programmable data processing devices, the functions/operations prescribed in the flow chart and/or block diagram are caused to be implemented. The program code may be executed completely on a computer, partly on a computer, partly on a computer as an independent software packet and partly on a remote computer, or completely on a remote computer or server.

In the context of the present disclosure, the machine-readable medium may be any tangible medium including or storing a program for or about an instruction executing system, device or device. The machine-readable medium may be a machine-readable signal medium or machine-readable storage medium. The machine-readable medium may include, but not limited to, electronic, magnetic, optical, electro-magnetic, infrared, or semiconductor system, device or device, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

Besides, although the operations are depicted in a particular order, it should not be understood that such operations are completed in a particular order as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any invention or claims, but should be explained as a description for a particular implementation of a particular invention. In the present description, some features described in the context of separate embodiments may also be integrated into a single implementation. On the contrary, various features described in the context of a single implementation may also be separately implemented in a plurality of embodiments or in any suitable sub-group.

Although the subject matter has been described in language specific to structural features and/or methodological actions, it should be understood that the subject matters specified in the appended claims are not limited to the specific features or actions described above. Rather, the specific features and actions described above are disclosed as example forms of implementing the claims.

We claim:

1. A method of determining spatial division of an environment, the method comprising:

determining a movement footprint of a user walking along a wall in the environment at least in part based on a communication between a first communication device and a second communication device, the first communication device being carried by the user, and the second communication device being placed in the environment;

generating a representation of the spatial division of the environment based on the determined movement footprint;

determining an estimated size associated with at least one reference object in the environment according to the representation of the spatial division;

obtaining a reference size associated with the at least one reference object; and adjusting the representation of the spatial division based on the estimated size and the reference size.

2. The method according to claim 1, wherein the determining the movement footprint comprises:

obtaining geomagnetic data sensed by a geomagnetic sensor in the first communication device while the user is walking along the wall in the environment; and determining the movement footprint based on the communication and the geomagnetic data.

3. The method according to claim 1, wherein the obtaining the estimated size associated with the at least one reference object comprises obtaining the estimated size of a first reference object within the environment, and the obtaining the reference size associated with the at least one reference object comprises obtaining the reference size of the first reference object.

4. The method according to claim 3, wherein the first reference object comprises a door or corridor within the environment, and the reference size comprises a reference width of the door or corridor.

5. The method according to claim 4, wherein the obtaining the reference size of the first reference object comprises:

obtaining a width of the door or the corridor sensed by a ranging sensor in the first communication device as the reference width.

6. The method according to claim 1, wherein the obtaining the estimated size associated with the at least one reference object comprises obtaining an estimated distance between a first reference object and a second reference object within the environment; and wherein the obtaining the reference size associated with the at least one reference object comprises obtaining a reference distance between the first reference object and the second reference object.

7. The method according to claim 1, further comprising:

causing the adjusted representation of the spatial division to be sent to a server.

8. The method according to claim 1, further comprising:

adjusting the representation of the spatial division further based on a user input.

9. The method according to claim 1, wherein the communication uses a wireless communication technology following one of Wi-Fi, Bluetooth, and Zigbee communication standards.

10. An electronic device, comprising:

a processor; and a memory coupled to the processor and storing instructions, the instructions, when executed by the processor, causing the electronic device to, determine a movement footprint of a user walking along a wall in the environment at least in part based on a communication between a first communication device and a second communication device, the first communication device being carried by the user, and the second communication device being placed in the environment;

generate a representation of the spatial division of the environment based on the determined movement footprint;

determine an estimated size associated with at least one reference object in the environment according to the representation of the spatial division;

obtain a reference size associated with the at least one reference object; and adjust the representation of the spatial division based on the estimated size and the reference size.

11. The device according to claim 10, wherein determining the movement footprint comprises:

obtaining geomagnetic data sensed by a geomagnetic sensor in the first communication device while the user is walking along the wall in the environment; and determining the movement footprint based on the communication and the geomagnetic data.

12. The device according to claim 10, wherein the obtaining the estimated size associated with the at least one reference object comprises obtaining the estimated size of a first reference object within the environment, and the obtaining the reference size associated with the at least one reference object comprises obtaining the reference size of the first reference object.

13. The device according to claim 12, wherein the first reference object comprises a door or corridor within the environment, and the reference size comprises a reference width of the door or corridor.

14. The device according to claim 13, wherein the obtaining the reference size of the first reference object comprises:

obtaining a width of the door or the corridor sensed by a ranging sensor in the first communication device as the reference width.

15. The device according to claim 1, wherein the obtaining the estimated size associated with the at least one reference object comprises obtaining an estimated distance between a first reference object and second reference object within the environment; and the obtaining the reference size associated with the at least one reference object comprises obtaining a reference distance between the first reference object and the second reference object.

16. The device according to claim 10, further comprising:

causing the adjusted representation of the spatial division to be sent to a server.

17. The device according to claim 10, further comprising:

adjusting the representation of the spatial division further based on a user input.

18. The device according to claim 10, wherein the communication uses a wireless communication technology following one of Wi-Fi, Bluetooth, and Zigbee communication standards.

19. A non-transitory computer readable storage medium tangibly storing instructions, the instructions, when executed by a processor, causing the processor to:

determine a movement footprint of a user walking along a wall in the environment at least in part based on a communication between a first communication device and a second communication device, the first communication device being carried by the user, and the second communication device being deployed in the environment;

generate a representation of the spatial division of the environment based on the determined movement footprint;

determine an estimated size associated with at least one reference object in the environment according to the representation of the spatial division;

obtain a reference size associated with the at least one reference object; and adjust the representation of the spatial division based on the estimated size and the reference size.

20. The computer readable storage medium according to claim 19, wherein the determining the movement footprint comprises:

obtaining geomagnetic data sensed by a geomagnetic sensor in the first communication device while the user is walking along the wall in the environment; and determining the movement footprint based on the communication and the geomagnetic data.

21. The computer readable storage medium according to claim 19, wherein
the obtaining the estimated size associated with the at least one reference object comprises obtaining the estimated size of a first reference object within the environment, and
the obtaining the reference size associated with the at least one reference object comprises obtaining the reference size of the first reference object.

22. The computer readable storage medium according to claim 19, wherein the at least one reference object in the environment comprises a door or corridor within the environment, and the reference size comprises a reference width of the door or corridor.

23. The computer readable storage medium according to claim 22, wherein the obtaining the reference size of the first reference object comprises:
obtaining a width of the door or the corridor sensed by a ranging sensor in the first communication device as the reference width.

24. The computer readable storage medium according to claim 19, wherein
the obtaining the estimated size associated with the at least one reference object comprises obtaining an estimated distance between a first reference object and a second reference object within the environment; and
wherein obtaining the reference size associated with the at least one reference object comprises obtaining a reference distance between the first reference object and the second reference object.

25. The computer readable storage medium according to claim 19, wherein the processor is further caused to:
cause the adjusted representation of the spatial division to be sent to a server.

26. The computer readable storage medium according to claim 19, wherein the processor is further caused to:
adjust the representation of the spatial division further based on a user input.

27. The computer readable storage medium according to claim 19, wherein the communication uses a wireless communication technology following one of Wi-Fi, Bluetooth, and Zigbee communication standards.

* * * * *